United States Patent [19]

Sparber

[11] 4,379,210
[45] Apr. 5, 1983

[54] RINGING DETECTOR FOR USE BY THE DEAF

[75] Inventor: Richard G. Sparber, Wheaton, Ill.

[73] Assignee: Bell Telephone Laboratories, Incorporated, Murray Hill, N.J.

[21] Appl. No.: 267,751

[22] Filed: May 28, 1981

[51] Int. Cl.³ .......................................... H04M 11/02
[52] U.S. Cl. .................................. 179/84 L; 179/81 C
[58] Field of Search ................. 179/84 L, 81 C, 84 C, 179/99 LS, 2 A, 5 R

[56] References Cited

U.S. PATENT DOCUMENTS

| 2,131,589 | 9/1938 | Halligan | 179/84 L |
| 2,616,972 | 11/1952 | McNutt | 179/84 L |
| 3,585,303 | 6/1971 | Chieffo | 179/84 L |

FOREIGN PATENT DOCUMENTS 2758542  6/1979  Fed. Rep. of Germany .

OTHER PUBLICATIONS

". . . By Persons With Physical Handicaps," *C & P Publication*, (Sep. 1966).
T. D. Towers and S. Libes, "Variable Control of A.C. with SCRs," *Semiconductor Circuit Elements*, (New Jersey: Hayden, 1977), pp. 167–169.

Primary Examiner—G. Z. Rubinson
Assistant Examiner—James L. Dwyer
Attorney, Agent, or Firm—W. H. Kamstra

[57] ABSTRACT

A ringing detector circuit for use by the deaf which may be connected between the tip and ring conductors (11, 12) of a subscriber set to cause an incandescent lamp (40) to flash to half brightness when ringing voltage is applied to the line. Closing a manual switch (22) allows the lamp (40) to burn at half brightness when the phone is not ringing and to flash to full brightness when the phone is ringing.

11 Claims, 2 Drawing Figures

RINGING DETECTOR FOR USE BY THE DEAF

TECHNICAL FIELD

This invention relates to telephone ringing detectors for use by the deaf and, more particularly, to such detectors including a visual indicator.

BACKGROUND OF THE INVENTION

One important result of the recent, increased social awareness of the needs and rights of handicapped persons has been the development of telecommunications devices for the deaf (TDD). Such devices, typically comprising a battery-powered, microprocessor-controlled teletypewriter with moving visual display, are acoustically coupled to conventional telephones to permit hearing-impaired persons to communicate readily and conveniently with others.

Special provisions must be made to alert hearing-impaired persons of incoming calls. One known ring indicator can be connected to any room lamp to cause the lamp to flash on repeatedly when ringing voltage is present on the telephone line. Further, if the lamp is being used to illuminate the room, the indicator will cause the lamp to flash off repeatedly to alert the hearing-impaired person. However, from a human-factors viewpoint, such an indicator is highly undesirable when the lamp used for alerting is also used to illuminate the room because the people in the room will be subjected to darkness during the active part of each ringing cycle. Accordingly, it is an object of the present invention to provide a reliable, inexpensive ringing detector which can be employed in conjunction with a lamp used for room illumination without annoying light interruptions during ringing.

SUMMARY OF THE INVENTION

The aforementioned object is advantageously realized in accordance with the principles of the invention in a ringing detector circit whereby a lamp is energized to a first level of illumination when no ringing voltage is applied to a telephone line and the lamp is energized to a second, higher level of illumination when ringing voltage is applied to the line. The ringing detector circuit is connectible to a telephone line and a source of alternating current and comprises a first circuit which supplies rectified current to the lamp during a first half of each cycle of alternating current supplied by the source irrespective of the presence or absence of ringing voltage on the line and a second circuit which responds to ringing voltage on the line by supplying rectified current to the lamp during a second half of each cycle. The onset of ringing on the line is indicated when the lamp goes from half brightness to full brightness. In one embodiment of the present invention, a manual switch is used to disconnect the first circuit when the lamp is not being used for room illumination. When this switch is open, the onset of ringing on the line is indicated when the lamp goes from OFF to half brightness.

BRIEF DESCRIPTION OF THE DRAWING

The features and advantages of a ringing detector circuit according to the principles of this invention will be better understood from a consideration of the detailed description of the organization and operation of one illustrative embodiment thereof which follows when taken in conjunction with the accompanying drawing in which.

DETAILED DESCRIPTION

Figure 1:
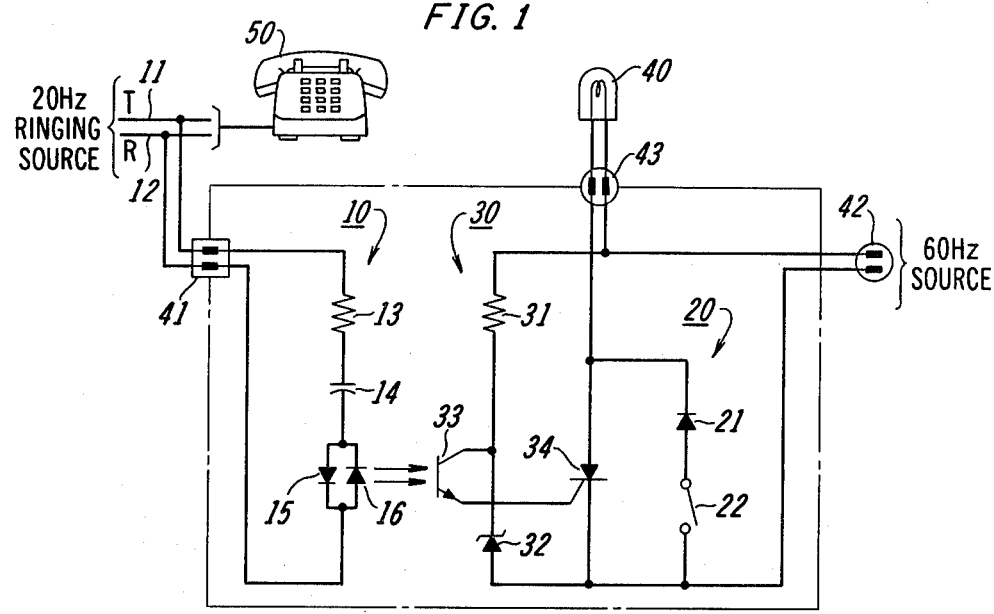
FIG. 1 is a circuit diagram of a ringing detector circuit in accordance with the present invention.

The organization of one illustrative ringing detector circuit according to the invention is shown in FIG. 1 as comprising a ringing voltage sensing circuit 10, a first rectifier circuit 20, and a second rectifier circuit 30. External connection to circuit 10 is made via a conventional telephone jack 41. Circuit 10 is connected in parallel with a subscriber set 50 to tip and ring conductors 11 and 12, which are understood as extending to a central office from which a 20 Hz ringing voltage is controlled. The parallel connection to tip and ring conductors 11 and 12 may be conveniently made, for example, via an extension cord for multiple plug-in telephones such as one disclosed in U.S. Pat. No. 4,047,787 of B. W. Gumb et al., issued Sept. 13, 1977. Circuit 10 includes a resistor 13 and a capacitor 14 connected in series with a parallel combination of oppositely-poled, light-emitting diodes 15 and 16. The particular values of resistor 13 and capacitor 14 are chosen so that circuit 10 has substantially the same impedance as a conventional ringer (not shown) within subscriber set 50.

Rectifier circuits 20 and 30 are used to control the flow of current to an incandescent lamp 40 from a source of 60 Hz current. The 60 Hz source and lamp 40 are connected to the circuit of the invention via a plug 42 and a socket 43, respectively. Lamp 40 conventionally has a manual ON/OFF switch (not shown) that is assumed to be in the ON position for the description which follows. Rectifier circuit 20 is connected between lamp 40 and the 60 Hz source and contains a diode 21 and a series connected, single-throw, single pole switch 22. Rectifier circuit 30 includes a resistor 31 and a Zener diode 32 connected in series across the 60 Hz source. Circuit 30 also includes a silicon controlled rectifier (SCR) 34, which is connected between lamp 40 and one side of the 60 Hz source, and a light-sensitive transistor 33, the collector of which is connected to the junction of resistor 31 and Zener diode 32 and the emitter of which is connected to a gate electrode of SCR 34.

Figure 2:
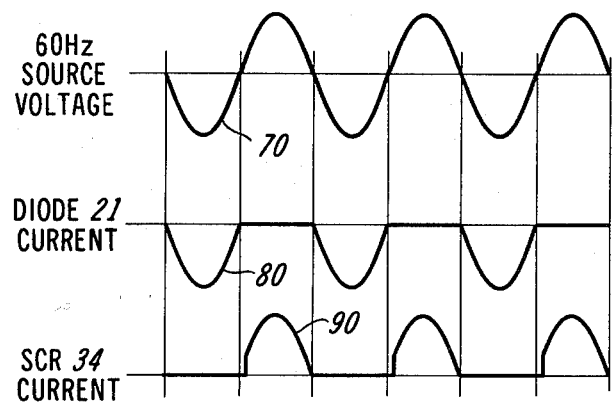
FIG. 2 illustrtes various idealized voltage and current waveforms appearing in the ringing detector circuit of FIG. 1 during its operative stages.

With the foregoing organization of an illustrative ringing detector according to the invention in mind, various of its operations may now be considered with particular reference to the waveform chart of FIG. 2. Assume that the ringing detector is connected to the source of 60 Hz current, tip and ring conductors 11 and 12 and lamp 40. Assume further that switch 22 is open and that no ringing voltage is present between conductors 11 and 12. Current flows through resistor 31 and Zener diode 32 but light-sensitive transistor 33 is OFF and, therefore, no current flows to the gate electrode of SCR 34. No current is supplied to lamp 40 through SCR 34 or diode 21 and lamp 40 is OFF. Zener diode 32 serves to protect light-sensitive transistor 33 by limiting the voltage that can be applied to its collector. As a first case, consider that lamp 40 is to be used both for room illumination and for alerting. Switch 22 is closed and a half-wave rectified current 80 is supplied to lamp 40 through diode 21 during the negative half of each cycle of the a-c voltage 70 supplied by the 60 Hz source. No current is supplied to lamp 40 during the positive half of each cycle and lamp 40 burns at half brightness to illuminate the room.

When ringing voltage is applied between conductors 11 and 12, current flows through circuit 10 and light-emitting diodes 15 and 16 generate optical alerting signals in response thereto. Light-sensitive transistor 33 turns ON in response to the optical alerting signals and the current flowing through resistor 31 is thereby diverted from Zener diode 32 to the gate of SCR 34 during the positive half of each cycle of supplied power. SCR 34 is triggered ON in response to this current during the positive half of each cycle and will remain ON until the negative half of each cycle. Accordingly, SCR 34 provides a half-wave rectified current 90 to lamp 40 during the positive half of each cycle. The precise point at which SCR 34 is triggered ON is determined by the value of resistor 31 and the trigger current requirement of SCR 34. Recall that switch 22 is closed and that current 80 from diode 21 flows through lamp 40 during the negative half of each cycle of supplied power. Accordingly, with switch 22 closed and ringing voltage present, both current 80 from diode 21 and current 90 from SCR 34 flow through lamp 40 during the active part of each ringing cycle. Lamp 40 flashes from half brightness to full brightness to alert those in the room of the incoming call.

As a second case, consider that lamp 40 is not to be used for room illumination but only for alerting. Switch 22 is opened and no current flows through lamp 40 in the absence of ringing voltage. When ringing voltage is present, only current 90 from SCR 34 flows through lamp 40. Accordingly, lamp 40 flashes from OFF to half brightness during the active part of each ringing cycle.

What has been described is considered to be only one specific ringing detector circuit according to the invention, and it is to be understood that various and numerous other circuits may be devised by one skilled in the art without departing from the spirit and scope thereof as defined by the accompanying claims.

What is claimed is:

1. A telephone ringing detector circuit connectible between an illuminating device and a source of alternating current and to a telephone line, said detector circuit comprising:
    first circuit means including first rectifier means connected between said illuminating device and said source for supplying current to said illuminating device only during first half cycles of said alternating current for energizing said illuminating device to a first level of illumination; and
    second circuit means including second rectifier means and also connected between said illuminating device and said source operated responsive to ringing voltage on said line for supplying current to said illuminating device also during second half cycles of said alternating current for energizing said illuminating device to a second, higher level of illumination.

2. A telephone ringing detector circuit as claimed in claim 1 wherein said second circuit means further includes:
    light-emitting means for generating optical alerting signals responsive to said ringing voltage; and
    a light-sensitive device connected to said source energized responsive to said alerting signals for controlling said second rectifier means.

3. A telephone ringing detector circuit as claimed in claim 2 wherein said second rectifier means comprises a silicon controlled rectifier having a gate electrode.

4. A telephone ringing detector circuit as claimed in claim 2 wherein said second circuit means further includes trigger circuit means connected to said source for developing a trigger current and wherein said light-sensitive device supplies said trigger current to said gate electrode when energized in response to said alerting signals.

5. A telephone ringing detector circuit as claimed in claim 4 wherein said trigger circuit means comprises a resistor and a Zener diode connected in series across said source, and wherein said light-sensitive device comprises a phototransistor having a collector connected to the junction of said resistor and said diode and having an emitter connected to said gate electrode.

6. A telephone ringing detector circuit as claimed in claims 1, 2, 3, 4 or 5 wherein said first circuit means further includes switch means for disconnecting said first rectifier means.

7. A telephone ringing detector circuit comprising:
    a first input terminal for receiving telephone ringing voltage;
    a second input terminal for receiving an alternating current;
    an output terminal;
    first circuit means including first rectifier means connected to said second input terminal and said output terminal for supplying current to a load only during first half cycles of said alternating current received at said second input terminal when said load is connected to said output terminal; and
    second circuit means including second rectifier means connected to said second input terminal and said output terminal and operated responsive to said ringing voltage received at said first input terminal for supplying current to said load also during second half cycles of said alternating current receiving at said second input terminal when said load is connected to said output terminal.

8. A telephone ringing detector circuit as claimed in claim 7 wherein said second circuit means further includes control means connected to said first input terminal and said second input terminal energized in response to said ringing voltage received at said first input terminal and said alternating current received at said second input terminal for controlling said second rectifier means.

9. A telephone ringing detector circuit as claimed in claim 8 wherein said second rectifier means comprises a silicon controlled rectifier.

10. A telephone ringing detector circuit as claimed in claim 9 wherein said control means comprises:
    light-emitting means for generating optical alerting signals responsive to said ringing voltage received at said first input terminal; and
    a light-sensitive device energized responsive to said alerting signals and said alternating current received at said second input terminal for controlling said silicon controlled rectifier.

11. A telephone ringing detector circuit as claimed in claims 7, 8, 9, or 10 wherein said first circuit means further includes switch means for disconnecting said first rectifier means.

* * * * *

UNITED STATES PATENT AND TRADEMARK OFFICE
CERTIFICATE OF CORRECTION

PATENT NO. : 4,379,210

DATED : April 5, 1983

INVENTOR(S) : Richard G. Sparber

It is certified that error appears in the above-identified patent and that said Letters Patent is hereby corrected as shown below:

In the claims, Column 4, line 5, after "claim" "2" should read --3--.
Column 4, line 39, after "current" "receiving" should read --received--.

Signed and Sealed this

Sixth Day of September 1983

[SEAL]

Attest:

GERALD J. MOSSINGHOFF

*Attesting Officer*  *Commissioner of Patents and Trademarks*